Reissued June 19, 1928. Re. 17,001

UNITED STATES PATENT OFFICE.

TURE ROBERT HAGLUND, OF STOCKHOLM, SWEDEN, ASSIGNOR TO INTERNATIONAL PATENT CORPORATION, A CORPORATION OF MARYLAND.

PROCESS OF TREATING ORES CONTAINING A REFRACTORY OXIDE.

No Drawing. Original No. 1,569,483, dated January 12, 1926, Serial No. 579,964, filed August 5, 1922. Application for reissue filed October 29, 1927. Serial No. 229,786.

The object of the present invention is: out of oxidic raw materials containing several oxides to separate one or more oxides, for example $SiO_2$, $Fe_2O_3$, CaO etc. This separation or purification is according to the present invention effected by a process wherein the oxide or oxides from which the raw material is to be purified, are separated by reduction or by conversion into non-oxidic compounds by the smelting of the raw material containing the oxides in question, for example in an electric furnace, together with sulphurous materials and the necessary reducing agents, the process being carried out in such a way as to result in the formation of a melt containing both sulphide and oxide, but entirely or essentially free from the oxides to be separated, i. e. in such a way that the melted mass is substantially free from such oxides from which the raw material is to be purified. The melt containing sulphide and oxide thus obtained can be used for various purposes: thus, for example, if its oxide content consists entirely, or in essentials, of aluminum oxide, it may be used as raw material for the manufacture of alloys. As in the cooling of the sulphide-oxide melt, its content of oxide substantially crystallizes, the melt is moreover very well adapted for the production, of pure or purified oxides, or of oxide compounds or mixtures of oxides purified from injurious oxides, which is effected by the separation of the sulphide content, for example by treatment of the crystallized melt with acids, alkalies, water or steam.

Should the sulphide-oxide melt not be sufficiently pure, it may be subjected to remelting, for example together with reducing agents and, if necessary, additional admixtures of sulphurous materials.

The process is particularly well adapted for the production of aluminium oxide, especially of the kind which is sufficiently pure to be used for the manufacture of pure aluminium metal by melt-electrolysis. As in the process the aluminium oxide is obtained in a crystallized form, it can also be used for grinding purposes, for example for the manufacture of grinding discs, or the like. Moreover, aluminium oxide, produced in accordance with the present process is a very suitable material for the manufacture of refractory bricks. If, for example, in order to attain a certain grinding action, it is desired that the aluminium oxide should contain other oxides, this may be effected by regulating the reduction in suitable way during the smelting and, if necessary, by the addition during the smelting of any special admixtures that may be required. The process is also suitable for the manufacture of other oxides. Thus, it is possible in accordance with the process to manufacture crystallized magnesium oxide, either pure or with a certain desired content of other oxides.

As crystallized magnesium oxide manufactured in accordance with the process does not, like amorphous oxide, show a great tendency to shrink at high temperatures, it is particularly well adapted for the manufacture of refractory bricks. Amongst other oxides which can be manufactured in a crystallized form in accordance with the process may, as example, be mentioned, alkaline earth oxides, zirconia (zirconium-oxide), and others.

As the process is of great importance for the manufacture of aluminium oxide, such manufacture is by way of example described in greater detail here below:

I first produce a melt containing as its principal component a mixture of $Al_2O_3$ and one or more sulphides, for example $Al_2S_3$, which have the capacity of dissolving aluminium oxide in a molten state, but out of which melt aluminium oxide crystallizes on cooling, is first of all made. This melt containing oxide and sulphide may be produced for example by smelting in an electric arc furnace the raw material in the presence of reducing agents, such as coke, small coal, charcoal, calcium carbide, etc. in order entirely or essentially to reduce certain oxides, such as $SiO_2$, $Fe_2O_3$, FeO, $TiO_2$ etc. which together with $Al_2O_3$ are contained in the raw materials. By treating this melt so that the sulphide is decomposed and separated off, or dissolved out, a crystal mass consisting of practically pure aluminium oxide is obtained.

The most suitable raw material containing $Al_2O_3$ for the manufacture of aluminium oxide in this manner is bauxite, but it is also possible to employ other minerals, or the like containing $Al_2O_3$, such as chamotte, feldspar, alum schists, leptite, clays, for example those containing carbon, coal waste containing $Al_2O_3$ and others, as well as products containing $Al_2O_3$ manufactured in accordance with some method, such as, for example, alundum contaminated by $SiO_2$ or FeO. Several different kinds of raw materials containing aluminium may, of course, be used simultaneously or together.

The following may serve as examples of the process for the manufacture of a sulphide-alumina belt of the kind above referred to:—

*Example 1.*—Bauxite—if desired after previous drying and heating to incandescence—is melted in an electric furnace together with ferrous sulphide and coal. The coal is added in a quantity sufficient to reduce ferro-, silico-, and titanic oxygen compounds in the bauxite, and, for example, 25% of the $Al_2O_3$ in the bauxite. The reduced iron, silicon and titanium alloy themselves in the main with one another, and the alloy sinks to the bottom in the furnace. The reduced aluminium is converted with FeS into iron, which enters as an ingredient into the alloy, and $Al_2S_3$, which absorbs by dissolving the remaining $Al_2O_3$ in the bauxite, if desired, the quantity of FeS can be so chosen that part of the reduced aluminium metal is obtained in the alloy, with a view to diminish the risk of too high a content of sulphur in the said alloy. The smelting should preferably be carried on continuously. In this way there will be obtained on tapping the furnace partly ferro-silicon or the like and partly a sulphide-alumina melt in which latter, on cooling, $Al_2O_3$ crystallizes out.

*Example 2.*—Bauxite, which may be calcined, is melted, preferably in an electric furnace, together with reducing agents in a quantity sufficient to reduce in the main oxides such as FeO, $SiO_2$, $TiO_2$, etc., which in addition to $Al_2O_3$ are present in the bauxite and a sulphide, for example CaS or $Al_2S_3$. The $Al_2O_3$ in the bauxite is thereby dissolved by the sulphide, and then crystallizes on cooling. Ferro-silicon is moreover obtained. In order to be assured of obtaining reduced silicon bound in the alloy, it is also suitable to charge iron in some form, for example iron filings, or else a ferro-compound together with reducing agents.

As is evident from the above examples, the sulphide in the sulphide-alumina melt can be obtained in the processes by the addition of sulphides with a lower heat of formation than $Al_2S_3$, which sulphides are converted with aluminium, or, in the presence of reducing agents, with $Al_2O_3$, into aluminium sulphide. If it desired to obtain a sulphide other than $Al_2S_3$ in the sulphide-alumina melt, one may add substances which in the presence of the sulphide admixtures above referred to give rise to sulphide with a higher heat of formation than $Al_2S_3$. Such admixtures may, for example, consist of CaO, MgO, BaO, or others, or else compounds or raw materials containing such substances, or again alloys or metals containing substances which give rise to sulphides with a higher equivalent generating heat than $Al_2S_3$, as, for example, ferro-manganese. Sulphides of the kind above indicated suitable for the process, i. e. such which have a lower heat of formation than $Al_2S_3$, are sulphides of heavy metal such as FeS, $Cu_2S$, etc. It is also possible to use minerals, or other products containing such sulphides, for instance magnetic iron pyrites ($Fe_6S_7$), for example a nickeliferous kind of such pyrites, ordinary pyrites, copper pyrites, copper glance, galena, crude copper (copper matte) ore etc, Obviously also other sulphur compounds of these metals, such as sulphates, may be employed, which however require a special reducing agent to convert them into sulphides. It is also possible to employ simultaneously several of the above mentioned sulphur compounds.

In lieu of, or simultaneously with, the above sulphur compounds, it is also possible to employ one or more sulphides which have an equal or higher equivalent generating heat than $Al_2S_3$, which sulphides in the main do not undergo chemical transformation in the process, but enter into the sulphide-alumina melt as the sulphide or sulphides which in a molten state constitute the solvent for $Al_2O_3$. Sulphides suitable for this purpose are, for example, $Al_2S_3$, sulphides of alkali and alkaline earth metals, such as $K_2S$, $Na_2S$, BaS, CaS, MgS, etc. These sulphides may be exchanged wholly or partially for the corresponding sulphates or sulphites, for example, $CaSO_4$, $BaSO_4$, etc., together with reducing agents required for their reduction. In certain cases sulphur also may be used as an admixture for the formation of the required sulphide, for instance if any carbide, for example calcium carbide, is employed as a reducing agent in the process.

In the procedure according to Example 2 it was stated that a separate addition of iron could be made in order to ensure that silicon should be bound in the alloy. The iron, both in this and in other forms of the process may obviously be replaced entirely or partially by some other metal, e. g. copper, moreover in order to obtain such metal, the admixtures may obviously consist of metal oxides, e. g. $Fe_2O_3$, FeO, $Fe_3O_4$, etc., together with reducing agents.

The quantity of sulphide in the sulphide alumina melt may obviously be varied within wide limits. It is suitable to work with a sulphide content of 20–40%, but in certain cases a considerably lower content may suffice, for example down to 10% or lower. In case of a higher content of sulphide the crystals will be larger, whence, if large crystals are desired, one should work with a high percentage of sulphide, e. g. up to 75% or more. The size of the crystals may also be regulated by changes in the rate of cooling of the sulphide-alumina melt.

The sulphide-alumina melt is far more fusible than $Al_2O_3$, and in determining the percentage of sulphide, the obtaining of a low melting-point may also be taken into consideration.

The sulphide-alumina melt separates itself easily from the alloy simultaneously obtained, and is treated after the cooling for the production of $Al_2O_3$. This procedure may, for example, be carried out by treating the melt, preferably after crushing, with some acid, e. g. $H_2SO_4$, HCl, $HNO_3$, acetic acid, etc. or a mixture of two or more such acids. By this means the sulphide is decomposed and dissolved. The melt is as a rule contaminated with heavy metal sulphide, e. g. FeS. On the melt being dissolved with acid in excess, this impurity enters into solution. As an undissolved remainder is obtained a crystal mass of $Al_2O_3$, which, if necessary, can be freed by washing or decantering from minor impurities insoluble in the acid, e. g. $SiO_2$, and, if desired, it may be treated for the same purpose with alkaline lye, e. g. NaOH. The crystal mass of $Al_2O_3$ is then dried.

If the sulphide-alumina melt contains $Al_2S_3$ it is possible out of the solution obtained in the treatment of the melt if necessary after purifying from impurities such as salts of iron to produce aluminium hydrate and to produce out of the latter pure $Al_2O_3$, or else the solution may be used for the production of aluminium salts, e. g. aluminium sulphate.

The dissolution of the sulphide in the sulphide-alumina melt may also be carried out in two or more stages. This is especially advisable if the sulphide consists of aluminium sulphide. If a deficit of acid is used the first time, there will be obtained a solution practically free from iron, as the iron sulphide is not dissolved until practically all the $Al_2S_3$ is dissolved. In the treatment of the remainder with new acid in excess, the remainder of the $Al_2S_3$ and any FeS that occurs will be dissolved. On the dissolving of the melt in acid $H_2S$ is developed which may be collected or utilized separately.

Instead of dissolving with acid, it is possible, if the sulphide consists of a sulphide easily decomposed or dissolved by water, such as $Al_2S_3$, $Na_2S$, etc., first to treat the sulphide-alumina melt with water or steam. "Water" as used in the accompanying claims includes steam. If the sulphide consists, for example, of $Na_2S$, $K_2S$, or BaS, it enters into solution on being treated with water. If the sulphide consists of $Al_2S_3$, it is decomposed under the development of $H_2S$ and the formation of aluminium hydrate. The aluminium hydrate can then be dissolved with acids or alkalies and be treated for the production of pure $Al_2O_3$, or for aluminium salts, or else the aluminium hydrate can be separated by washing or stirring and decantering from the crystal of $Al_2O_3$. The latter should then be treated with acid for the dissolving of any impurities, such as FeS. The washed or decantered aluminium hydrate can, after drying and eventually heating to redness, be used as raw material for renewed production of a sulphide-alumina melt, or else be used as raw material for the manufacture of pure $Al_2O_3$, or aluminium salts, for example in accordance with methods which in themselves are known.

Any metal, magnetic sulphide or the like which may occur in the alumina crystal mass or in the decanted aluminium hydrate may eventually be separated by methods commonly employed in the separation of ore, such as by magnetic or electrostatic separation, etc.

The manufacture of other oxides in accordance with the process is carried out in a manner analogous to the procedure for the manufacture of $Al_2O_3$. In the manufacture of crystallized MgO burned magnesite may, for example, be used as raw material. The chief impurities in the latter are CaO, $SiO_2$, and $Fe_2O_3$. The separation of these oxidic impurities may for example be carried out by smelting the magnesite together with such a quantity of a reducing agent that $SiO_2$ and $Fe_2O_3$ are reduced and that CaO and possibly some MgO react with a sulphurous admixture made for the purpose, for example magnetic iron pyrites or FeS, and form CaS and MgS. The remaining MgO will then be dissolved in a molten condition into the calcium and magnesium sulphides and will crystallize on cooling. CaS and MgS are separated off afterwards, e. g. by soaking with water or diluted acids.

Having thus described my invention I declare that what I claim is:

1. The process of treating ores containing iron, silicon or titanium and a refractory metal oxide which does not fuse below 1940° C. comprising reducing oxides of iron, silicon or titanium and dissolving the refractory oxide in a sulfide containing slag by fusing the ore with a sulfide yielding material and a reducing agent, the proportion of sulfide containing material being such that a part of the refractory metal oxide remains unconverted in the slag and separating the reduced iron, silicon or titanium from the sulfide-refractory-oxide slag.

2. The process of treating ores containing iron, silicon or titanium and a refractory metal oxide which does not fuse below 1940° C. comprising reducing oxides of iron, silicon or titanium and dissolving the refractory metal oxide in a sulfide containing slag by fusing the ore with a sulfide yielding material and a reducing agent, the proportion of sulfide-containing material being such that the slag contains not to exceed 75% of sulfide, the balance of the slag being formed by the dissolved refractory oxide and separating the reduced iron, silicon or titanium from the sulfide-refractory-oxide slag.

3. The process of treating ores containing iron, silicon or titanium and a refractory metal oxide which does not fuse below 1940° C. comprising reducing oxides of iron, silicon or titanium and dissolving the refractory oxide in a sulfide containing slag by fusing the ore with metallic sulfides and a reducing agent, the proportion of the metallic sulfides being such that a part of the refractory metal oxide remains unconverted in the slag and separating the reduced iron, silicon or titanium from the sulfide-refractory-oxide slag.

4. The process of removing oxides of iron, silicon or titanium from ores containing a difficultly reducible metal oxide which does not fuse below 1940° C., which comprises heating the ore with a metallic sulfide and a reducing agent, the proportion of metallic sulfide being such that a part of the difficultly reducible metal oxide remains unconverted in the slag and tapping and separating the reduced iron, silicon or titanium and the sulfide-refractory-oxide slag.

5. The process of removing oxides of iron, silicon or titanium from ores containing refractory metal oxides which do not fuse below 1940° C., which comprises heating the ore with metallic sulfides and a reducing agent, the proportion of metallic sulphides being such that a part of the refractory metal oxides remains unconverted in the slag, separating the reduced iron, silicon or titanium from the sulfide-refractory-oxide slag and separating the refractory oxides from the slag.

6. The process of removing oxides of iron, silicon or titanium from ores containing refractory metal oxides which do not fuse below 1940° C., which comprises heating the ore with metallic sulfides and a reducing agent, the proportion of metallic sulfides being such that a part of the refractory metal oxides remains unconverted in the slag, separating the reduced iron, silicon or titanium from the sulfide-refractory-oxide slag, and separating the refractory oxides from the slag.

7. The process of removing oxides of iron, silicon or titanium from ores containing metal oxides which do not fuse below 1940° C., which comprises heating the ore with metallic sulfides having a heat of formation not higher than aluminum sulfide and a reducing agent, the proportion of metallic sulfides being such that a part of the metal oxides remains unconverted in the slag and tapping and separating the reduced iron, silicon or titanium and the sulfide-refractory-oxide slag.

8. The process of removing oxides of iron, silicon or titanium from ores containing difficultly reducible metal oxides which do not fuse below 1940° C., which comprises heating the ore with metallic sulfides having a heat of formation not higher than aluminum sulfide and a reducing agent, the proportion of the metallic sulfides being such that the slag contains not to exceed 75% of sulfide, the balance of the slag being formed by the dissolved metal oxides and tapping and separating the reduced iron, silicon or titanium and the sulfide-refractory-oxide slag.

9. The process of removing oxides of iron, silicon or titanium from ores containing refractory metal oxides which do not fuse below 1940° C., which comprises heating the ore with metallic sulfides having a heat of formation not higher than aluminum sulfide and a reducing agent, the proportion of metallic sulphides being such that a part of the refractory metal oxides remains unconverted in the slag, separating the reduced iron, silicon or titanium from the sulfide-refractory-oxide slag and separating the refractory oxides from the slag.

10. The process of removing oxides of iron, silicon or titanium from ores containing refractory metal oxides which do not fuse below 1940° C., which comprises heating the ore with metallic sulfides having a heat of formation not higher than aluminum sulfide and a reducing agent, the proportion of metallic sulphides being such that a part of the refractory metal oxides remains unconverted in the slag, separating the reduced iron, silicon or titanium from the sulfide-refractory-oxide slag and separating the refractory oxides from the slag.

11. The process of treating ores containing iron, silicon or titanium and aluminum oxide comprising reducing oxides of iron, silicon or titanium and dissolving the aluminum oxide in a sulfide containing slag by fusing the ore with a sulfide yielding material and a reducing agent, the proportion of sulfide-yielding material being such that a part of the aluminum oxide remains unconverted in the slag, and separating the sulfide-aluminum-oxide slag from the reduced iron, silicon or titanium.

12. The process of treating ores containing iron, silicon or titanium and aluminum oxide comprising reducing oxides of iron, silicon or titanium and dissolving the aluminum oxide in a sulfide containing slag by fusing the ore with a sulfide yielding material and a reducing agent, the proportion of sulphide being such that a part of the aluminum oxide remains unconverted in the slag, separating the sulfide-aluminum-oxide slag from the reduced iron, silicon or titanium and separating the aluminum oxide from the slag.

13. The process of treating bauxite comprising reducing oxides of iron, silicon and titanium and dissolving aluminum oxide in a sulfide containing slag by fusing the bauxite with a sulfide yielding material and a reducing agent, the proportion of sulfide-yielding material being such that the slag contains not to exceed 75% of sulfide, the balance of the slag being formed by the dissolved aluminum oxide and separating the sulfide-aluminum-oxide slag from the reduced alloy.

14. The process of treating bauxite comprising reducing oxides of iron, silicon and titanium and dissolving aluminum-oxide in a sulfide containing slag by fusing the bauxite with a sulfide yielding material and a reducing agent, the proportion of sulphide being such that a part of the aluminum oxide remains unconverted in the slag, separating the sulfide-aluminum-oxide slag from the reduced alloy and separating the aluminum oxide from the slag.

15. The process of treating ores containing aluminum oxide comprising reducing oxides of iron, silicon or titanium and dissolving aluminum-oxide in a sulfide containing slag by fusing the ore with a sulfide and a reducing agent, the proportion of sulfide being such that a part of the aluminum oxide remains unconverted in the slag, and separating the sulfide-aluminum-oxide slag from the reduced iron, silicon or titanium.

16. The process of treating ores containing aluminum-oxide comprising reducing oxides of iron, silicon or titanium and dissolving aluminum-oxide in a sulfide containing slag by fusing the ore with a sulfide and a reducing agent, the proportion of sulphide being such that a part of the aluminum oxide remains unconverted in the slag, separating the sulfide-aluminum-oxide slag from the reduced iron, silicon or titanium and separating the aluminum-oxide from the slag.

17. The process of treating bauxite comprising reducing oxides of iron, silicon and titanium and dissolving aluminum oxide in a sulfide containing slag by fusing the bauxite with a sulfide and a reducing agent, the proportion of sulfide being such that a part of the aluminum oxide remains unconverted in the slag and separating the sulfide-aluminum-oxide slag from the reduced alloy.

18. The process of treating bauxite comprising reducing oxides of iron, silicon and titanium and dissolving aluminum-oxide in a sulfide containing slag by fusing the bauxite with a sulfide and a reducing agent, the proportion of sulphide being such that a part of the aluminum oxide remains unconverted in the slag, separating the sulfide-aluminum-oxide slag from the reduced alloy and separating the aluminum oxide from the slag.

19. The process of treating ores containing iron, silicon or titanium and aluminum-oxide comprising reducing oxides of iron, silicon or titanium and dissolving the aluminum-oxide in a sulfide containing slag by fusing the ore with a sulfide having a heat of formation not higher than that of aluminum sulfide and a reducing agent, the proportion of sulfide being such that the slag contains not to exceed 75% of sulfide, the balance of the slag being formed by the dissolved aluminum oxide and separating the sulfide-aluminum-oxide slag from the reduced iron, silicon or titanium.

20. The process of treating ores containing iron, silicon or titanium and aluminum oxide comprising reducing oxides of iron, silicon or titanium and dissolving aluminum-oxide in a sulfide containing slag by fusing the ore with a sulfide having a heat of formation not higher than that of aluminum sulfide and a reducing agent and separating the sulfide-aluminum-oxide slag from the reduced iron, silicon or titanium and separating out the pure aluminum-oxide from the slag.

21. The process of treating bauxite comprising reducing oxides of iron, silicon and titanium and dissolving aluminum-oxide in a sulfide containing slag by fusing the bauxite with a sulfide having a heat of formation not higher than that of aluminum sulfide and a reducing agent, the proportion of sulfide being such that a part of the aluminum oxide remains unconverted in the slag and separating the sulfide-aluminum-oxide slag from the reduced alloy.

22. The process of treating bauxite comprising reducing oxides of iron, silicon and titanium and dissolving aluminum-oxide in a sulfide containing slag by fusing the bauxite with a sulfide having a heat of formation not higher than that of aluminum sulfide and a reducing agent and separating the sulfide-aluminum-oxide slag from the reduced alloy, and separating out the pure aluminum-oxide from the slag.

23. The process of removing oxides of iron, silicon or titanium from ores containing aluminum oxide which comprises fusing the ore with an iron sulfide and a reducing agent and tapping and separating the sulfide-aluminum-oxide slag and the reduced iron, silicon or titanium and cooling the slag for crystallizing the aluminum oxide.

24. The process of removing oxides of iron, silicon or titanium from ores containing aluminum oxide, which comprises fusing the ore with an iron sulfide and a reducing agent and separating the sulfide-aluminum-oxide slag from the reduced iron, silicon or titanium and separating out the pure aluminum oxide from the slag.

25. The process of removing the oxides of iron, silicon and titanium from bauxite, which comprises fusing it with an iron sulfide and a reducing agent and tapping and separating the sulfide-aluminum-oxide slag and the reduced iron-silicon-titanium alloy and cooling the slag for crystallizing the aluminum oxide and regulating the size of the crystals by the rate of cooling.

26. The process of removing the oxides of iron, silicon and titanium from bauxite, which comprises fusing it with an iron sulfide and a reducing agent and separating the sulfide-aluminum-oxide slag from the reduced iron-silicon-titanium alloy and separating out the pure aluminum oxide from the slag.

27. The process of removing oxides of iron, silicon or titanium from ores containing aluminum oxide, which comprises fusing the ore with an iron sulfide and carbon and tapping and separating the sulfide-aluminum-oxide slag and the reduced iron, silicon or titanium and cooling the slag for crystallizing the aluminum oxide.

28. The process of removing oxides of iron, silicon or titanium from ores containing aluminum oxide, which comprises fusing the ore with an iron sulfide and carbon and separating the sulfide-aluminum-oxide slag from the reduced iron, silicon or titanium, and separating out the pure aluminum oxide from the slag.

29. The process of removing the oxides of iron, silicon and titanium from bauxite, which comprises fusing it with an iron sulfide and carbon and tapping and separating the sulfide-aluminum-oxide slag and the reduced iron-silicon-titanium alloy and cooling the slag for crystallizing the aluminum oxide and regulating the rate of cooling for forming comparatively small crystals.

30. The process of removing the oxides of iron, silicon and titanium from bauxite, which comprises fusing it with an iron sulfide and carbon and separating the sulfide-aluminum-oxide slag from the reduced iron-silicon-titanium alloy and separating out the pure aluminum oxide from the slag.

31. The process of removing oxides of iron, silicon or titanium from ores containing aluminum oxide, which comprises fusing the ore with iron pyrites and carbon, and tapping and separating the sulfide-aluminum-oxide slag and the reduced iron, silicon or titanium and cooling the slag for crystallizing the aluminum oxide.

32. The process of removing oxides of iron, silicon or titanium from the ores containing aluminum oxide, which comprises fusing the ore with iron pyrites and carbon and separating the sulfide-aluminum-oxide slag from the reduced iron, silicon or titanium and separating out the pure aluminum oxide from the slag.

33. The process of removing the oxides of iron, silicon and titanium from bauxite, which comprises fusing it with magnetic iron pyrites and carbon and tapping and separating the sulfide-aluminum-oxide slag and the reduced iron-silicon-titanium alloy and cooling the slag for crystallizing the aluminum oxide and regulating the rate of cooling for forming comparatively small crystals.

34. The process of removing the oxides of iron, silicon and titanium from bauxite, which comprises fusing it with magnetic iron pyrites and carbon and separating the sulfide-aluminum-oxide slag from the reduced iron-silicon-titanium alloy and separating out the pure aluminum oxide from the slag.

35. The process of removing oxides of iron, silicon or titanium from ores containing aluminum oxide, which comprises forming a sulfide-aluminum-oxide slag containing up to about 75 per cent of sulfide by fusing the ore with a metallic sulfide and carbon, the proportion of sulphide being such that a part of the aluminum oxide remains unconverted in the slag, and separating the sulfide-aluminum-oxide slag from the reduced iron, silicon or titanium.

36. The process of removing oxides of iron, silicon or titanium from ores containing aluminum oxide, which comprises forming a sulfide-aluminum-oxide slag containing up to about 75 per cent of sulfide by fusing the ore with a metallic sulfide and carbon, the proportion of sulphide being such that a part of the aluminum oxide remains unconverted in the slag, separating the sulfide-aluminum-oxide slag from the reduced iron, silicon or titanium and separating the aluminum oxide from the slag.

37. The process of removing iron, silicon and titanium from bauxite, which comprises forming a sulfide-aluminum-oxide slag containing up to about 75 per cent of sulfide by fusing bauxite with iron sulfide and carbon, the proportion of sulphide being such that a part of the aluminum oxide remains unconverted in the slag and separating the sulfide-aluminum-oxide slag from the reduced iron-silicon-titanium alloy.

38. The process of removing iron, silicon and titanium from bauxite, which comprises forming a sulfide-aluminum-oxide slag containing up to about 75 per cent of sulfide by fusing bauxite with iron sulfide and carbon, the proportion of sulphide being such that a part of the aluminum oxide remains unconverted in the slag, separating the sulfide-aluminum-oxide slag from the reduced iron-silicon-titanium alloy and separating the aluminum oxide from the slag.

39. The process of removing oxides of iron, silicon or titanium from ores containing aluminum oxide, which comprises forming a sulfide-aluminum-oxide slag containing from about 10 up to about 40 per cent of aluminum sulfide by fusing the ore with a metallic sulfide and carbon and separating the aluminum-sulfide-aluminum-oxide slag from the reduced iron, silicon or titanium.

40. The process of removing oxides of iron, silicon or titanium from ores containing aluminum oxide, which comprises forming a sulfide-aluminum-oxide slag containing from about 10 up to about 40 per cent of aluminum sulfide by fusing the ore with metallic sulfide and carbon and separating the aluminum-sulfide-aluminum-oxide slag from the reduced iron, silicon or titanium and decomposing the aluminum sulfide and separating out the pure aluminum oxide.

41. The process of removing oxides of iron, silicon and titanium from bauxite, which comprises forming a sulfide-aluminum-oxide slag containing from about 10 up to about 40 per cent of aluminum sulfide by fusing bauxite with iron sulfide and carbon and separating the aluminum-sulfide-aluminum-oxide slag from the reduced iron-silicon-titanium alloy.

42. The process of removing oxides of iron, silicon and titanium from bauxite, which comprises forming a sulfide-aluminum-oxide slag containing from about 10 up to about 40 per cent of aluminum sulfide by fusing bauxite with iron sulfide and carbon and separating the aluminum-sulfide-aluminum-oxide slag from the reduced iron-silicon-titanium alloy and decomposing the aluminum sulfide and separating out the pure aluminum oxide.

43. The process of removing oxides of iron, silicon or titanium from ores containing a difficultly reducible metal oxide which does not fuse below 1940° C., which comprises dissolving the difficultly reducible metal oxide in a sulfide-containing slag by fusing the ore with a reducing agent and materials yielding a sulfide separable through water, and treating the sulfide-refractory-oxide slag with water to separate the refractory oxide.

44. The process of treating ores containing a difficultly reducible refractory oxide comprising removing oxides of iron, silicon or titanium by heating the ore with reducing agents and dissolving the refractory oxide in a sulfide decomposable through water, and treating the sulfide-refractory-oxide-slag with water for decomposing sulfide and separating the refractory oxide from the decomposed slag.

45. The process of treating ores containing aluminum oxide comprising removing oxides of iron, silicon or titanium and dissolving aluminum oxide in a sulfide-containing slag by fusing the ore with a reducing agent and materials yielding a sulfide separable through water, cooling the sulfide-aluminum-oxide slag for crystallizing the aluminum oxide and treating the slag with water to separate the aluminum oxide.

46. The process of treating ores containing aluminum oxide comprising removing oxides of iron, silicon or titanium through reduction and dissolving aluminum oxide in a slag containing a sulfide decomposable by water and treating the slag with water to decompose sulfide.

47. The process of treating ores containing aluminum oxide comprising removing oxides of iron, silicon or titanium through reduction and dissolving aluminum oxide in a slag containing a sulfide decomposable by water, cooling the sulfide-aluminum-oxide slag to crystallize the aluminum oxide and thereupon decomposing the sulfide by treating the slag with water and separating the aluminum oxide from the decomposed slag.

48. The process of removing oxides of iron, silicon and titanium from bauxite, which comprises forming a sulfide-aluminum-oxide slag containing aluminum sulfide by fusing bauxite with a sulfide having a heat of formation less than that of aluminum sulfide and a reducing agent, crystallizing the aluminum oxide by cooling the slag and decomposing aluminum sulfide by treating the slag with water.

49. The process of removing oxides of iron, silicon and titanium from bauxite, which comprises forming a sulfide-aluminum-oxide slag containing aluminum sulfide by fusing bauxite with an iron sulfide and carbon, cooling the slag to crystallize the aluminum oxide, decomposing the aluminum sulfide by treating the slag with water and thereupon separating formed aluminum hydrate from the crystallized aluminum oxide.

50. The process of removing iron, silicon or titanium oxides from ores containing aluminum oxide, which comprises fusing the ore with a sulfide having a heat of formation not higher than that of aluminum sulfide and carbon in such amounts that a sulfide-aluminum-oxide slag containing aluminum sulfide in a quantity less than 40 per cent is formed, and decomposing aluminum sulfide by treating the slag with water.

51. The process of treating bauxite, which comprises removing oxides of iron, silicon and titanium and forming a sulfide-aluminum-oxide slag containing from about 10 up to about 40 per cent of aluminum sulfide by fusing bauxite with an iron sulfide and carbon, crystallizing aluminum oxide by cooling the slag, thereupon decomposing aluminum sulfide in the slag with water and separating formed aluminum hydrate from crystallized aluminum oxide.

In testimony whereof I have hereunto affixed my signature.

TURE ROBERT HAGLUND.